W. H. CANUP.
STOCK CAR.
APPLICATION FILED SEPT. 19, 1911.
1,055,132.
Patented Mar. 4, 1913.
2 SHEETS—SHEET 1.
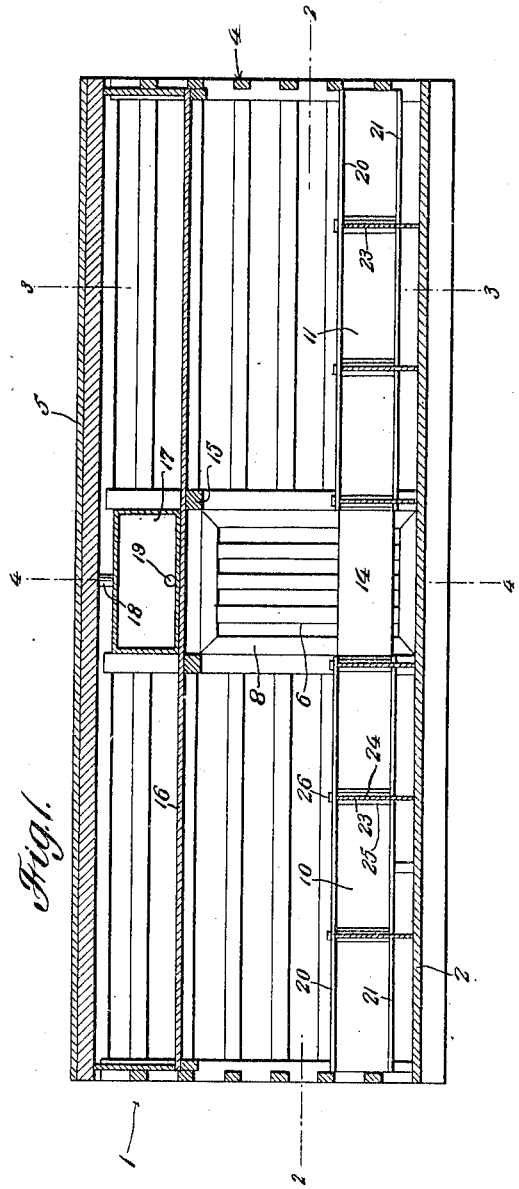
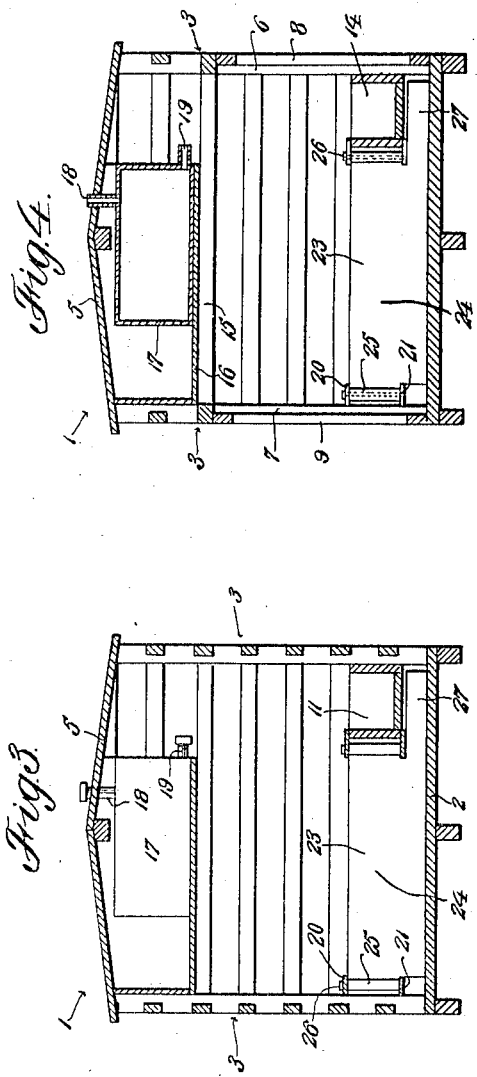
Witnesses
J. H. Crawford.
C. C. Hines.
Inventor
William H. Canup,
By Victor J. Evans
Attorney

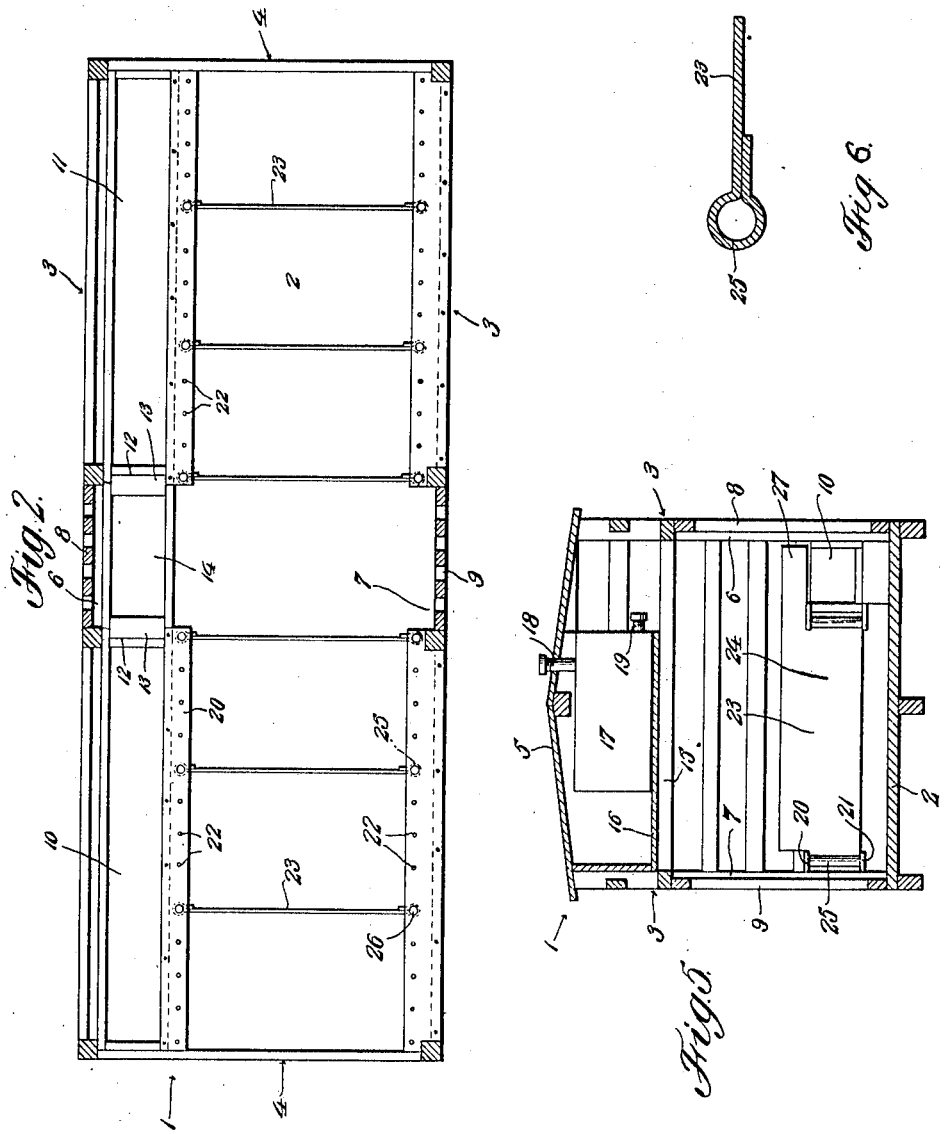

UNITED STATES PATENT OFFICE.

WILLIAM H. CANUP, OF SALISBURY, NORTH CAROLINA.

STOCK-CAR.

1,055,132.

Specification of Letters Patent.

Patented Mar. 4, 1913.

Application filed September 19, 1911. Serial No. 650,128.

*To all whom it may concern:*

Be it known that I, WILLIAM H. CANUP, citizen of the United States, residing at Salisbury, in the county of Rowan and State of North Carolina, have invented new and useful Improvements in Stock-Cars, of which the following is a specification.

This invention relates to cars for the transportation of cattle and other stock, the main object of the invention being to provide a car for transporting live stock long distances, without unloading the animals to rest, water or fed them, and whereby the animals may be shipped with greater comfort and convenience.

A further object of the invention is to provide a stock car in which the animals can be fed and watered while the train is running at full speed and without the necessity of the attendant going outside the car or climbing over or going between the stock.

A further object of the invention is to provide an improved construction and arrangement of feed troughs and water and feed storage means, together with adjustable partitions, whereby the widths of the stalls may be regulated to suit different sizes of animals and arranged to permit the animals to lie down with convenience and comfort, when desired.

This invention consists of the features of construction, combination and arrangement of parts, hereinafter fully described and claimed, reference being had to the accompanying drawings, in which:—

Figure 1 is a central vertical longitudinal section of a stock car embodying my invention. Fig. 2 is a horizontal section on the line 2—2 of Fig. 1. Figs. 3 and 4 are vertical transverse sections on the lines 3—3 and 4—4 of Fig. 1, showing the partitions in position to form closed stalls. Fig. 5 is a view similar to Fig. 4, showing the central trough sections removed and the adjacent partitions reversed to form the open-bottom stall. Fig. 6 is a detail section through the keeper-loop of one of the partitions.

Referring to the drawings, 1 designates the body of the car, which comprises a bottom 2, sides 3, ends 4 and a roof or top 5, the sides and ends of said body being preferably of slatted construction for free ventilation, while the top or roof slopes downward from its center toward the sides of the car for the free drainage of water during rainy or snowy weather. The side walls are respectively provided centrally of their length with door-ways 6 and 7, which may be closed by suitable gates or doors 8 and 9, respectively. The general body structure in other respects may conform to the types of cars now in common use.

Arranged longitudinally at one side within the car, on opposite sides of the door-way 6, or of the transverse center of the car, are feed or water troughs 10 and 11, each of which is preferably elevated a short distance above the floor of the car. These troughs may be made of wood, metal or other suitable material, and large enough to receive sufficient water or feed to supply the stock at the time of watering or feeding. The inner ends of the inner and outer walls of said troughs 10 and 11 project slightly beyond their inner end walls to provide guide-ways 12 to receive the projecting end walls 13 of a central removable trough section 14, which may be detached when it is desired to use the doorway 6, and placed in position when the car is loaded for the purpose of feeding and watering an animal disposed midway between the two troughs 10 and 11.

Cross pieces 15 are secured at a suitable elevation to the side walls of the car and support an upper deck or platform 16 arranged below the roof and which is designed to support the feed in bags or other suitable receptacles, which deck or platform is preferably open above the troughs to permit of the ready supply of food and water to the troughs from above, thus obviating the necessity of the attendant going outside of the car to fill the troughs or between the animals for such purpose. Supported upon the deck arranged in the compartment formed thereby below the car roof is a water storage tank 17, adapted to be filled from the outside of the car and through an inlet 18 and provided with an outlet 19 for the attachment of a hose whereby the water may be conducted therefrom to the troughs. It will thus be seen that the food or water may be supplied to the troughs in a ready and convenient manner without the necessity of the attendant leaving the deck or platform, and while the train is running at full speed.

Secured to the top and bottom of each trough 10 and 11 at one side of the car, and to the wall of the car at the opposite side thereof are sets of upper and lower retaining strips or rails 20 and 21, the rails of each set being provided with alining perforations or openings 22 at regular intervals apart. The lower rails of the sets are spaced a suitable distance above the floor of the car in order to permit the stall forming partitions to be disposed in position for use as hereinafter described. The stalls are formed by a series of partitions 23, made of sheet metal or other suitable material. Each of these partitions is of a length to extend between the sets of retaining rails, and is cut away at its ends to form projecting portions 24 of a depth to fit or to be received between the projecting portions of the rails of each set. These projecting portions 24 extend from one of the longitudinal edges of the partitions to a point short of the other longitudinal edge thereof, and beyond the longitudinal center of the partition, and are provided with keeper-loops 25 to receive retaining pins 26 adapted to be passed through the loops and registering perforations in the rails to secure the partition in adjusted position. By this construction it will be seen that the partitions may be disposed at different distances apart to make the stalls as wide or narrow as required to suit different sizes of stock. By arranging the partitions in the manner shown in Figs. 3 and 4, in which the loop-carrying portions of the partitions are arranged uppermost, the notched portions of the partitions will be projected downward, so that the longitudinal edges of said partitions will rest upon the bottom of the car and form closed or non-communicating stalls. By reversing the partitions in the manner shown in Fig. 3, so as to dispose the loop-carrying portions downward and the inlet portions uppermost, the partitions will be arranged to form higher stalls which are open at the bottom, so as to provide spaces to receive the legs of the animals when they are lying down, thus permitting the animals to resume a recumbent position with greater ease and convenience. One of the slotted portions of the partition may be provided with a projection 27 extending beyond the adjacent keeper-loop overhanging the stalls when the partition is arranged in the position shown in Fig. 5, thus preventing interference between the animals when feeding or watering. When the partition is disposed in the manner shown in Figs. 3 and 4, this guard or projection will extend beneath the trough, as shown. The keeper-loops 25 are formed by folded portions of the partitions when metallic partitions are used, and in the use of wooden partitions may be constructed of sheet metal and suitably secured to the partitions. These loops have their backturned portions free and unsecured, rendering the loop resilient and adapted to have a sliding engagement with the fastening pin, so as to provide a sufficiently loose connection to compensate for any springing motion of the side walls of the car, without damage to the partitions or other fastening means. It will be observed that the inner partitions of the two series of stall forming partitions on opposite sides of the transverse center of the car form a central stall in line with the door-ways in which an animal may be placed, for the feeding and watering of which the central trough 14 is provided.

From the foregoing description, the construction and mode of use of my improved cattle or stock car will be readily understood, and it will be seen that the invention provides a car which affords greater conveniences and advantages in the shipment and care of stock than in cars of ordinary construction, and which also provides for the safety of the attendants. It also provides a car which effects a saving of time and economy in the transportation of the stock, as the stock may be fed and watered without the necessity of stopping a train, the adjustable partitions also permit the stalls to be made wide enough to permit the animals to have sufficient freedom of motion for exercise.

Having thus described the invention, what I claim as new is:

A cattle car provided at one side thereof with central doorways, longitudinal troughs arranged at one side of the car on opposite sides of the doorway therein and spaced from the floor of the car, upper and lower sets of horizontal longitudinal retaining strips secured to the longitudinal troughs and the opposite wall of the car, said strips being provided with rows of perforations therein, edgewise reversible partitions extending transversely between the sets of retaining strips and forming series of stalls and an intermediate passageway between the doorways, said partitions being provided with resilient keeper loops projecting between the upper and lower strips, and each having at one end an extension at one side of and projecting beyond the adjacent loop, whereby the partitions are adapted to be reversed to project said extensions across the top of the troughs or into the spaces beneath said troughs and fastening pins adapted to be passed through said loops and the perforations in the strips.

In testimony whereof I affix my signature in presence of two witnesses.

WILLIAM H. CANUP.

Witnesses:
JOHN J. STEWART,
HAYDEN CLEMENT.